(No Model.) 7 Sheets—Sheet 1.

W. R. JOHNS.
SELF REGISTERING SCALE.

No. 454,966. Patented June 30, 1891.

Witnesses.
Lauritz N. Möller
Mary C. Möller

Inventor
Will R. Johns
by W. A. Copeland
his atty.

(No Model.) 7 Sheets—Sheet 3.
W. R. JOHNS.
SELF REGISTERING SCALE.

No. 454,966. Patented June 30, 1891.

Witnesses.
Lauritz W Möller
Mary C. Möller

Inventor.
Will R. Johns
by N. A. Copeland,
his atty.

(No Model.) 7 Sheets—Sheet 4.
W. R. JOHNS.
SELF REGISTERING SCALE.

No. 454,966. Patented June 30, 1891.

Witnesses.
Lauritz N. Möller
Mary C. Möller

Inventor.
Will R. Johns.
by W. A. Copeland.
his atty.

(No Model.)　　　　　　　　　　　　　　　　　　　7 Sheets—Sheet 5.
W. R. JOHNS.
SELF REGISTERING SCALE.

No. 454,966.　　　　　　　　　　　　　　　Patented June 30, 1891.

Witnesses.　　　　　　　　　　　　　　　　Inventor
Lauritz W. Möller　　　　　　　　　　　Will R. Johns,
Mary C. Möller　　　　　　　　　　　　　by W. A. Copeland,
　　　　　　　　　　　　　　　　　　　　his atty.

(No Model.) 7 Sheets—Sheet 6.

W. R. JOHNS.
SELF REGISTERING SCALE.

No. 454,966. Patented June 30, 1891.

Witnesses.
Lauritz H. Möller
Mary C. Möller

Inventor
Will R. Johns
by W. A. Copeland,
his atty.

(No Model.) 7 Sheets—Sheet 7.

W. R. JOHNS.
SELF REGISTERING SCALE.

No. 454,966. Patented June 30, 1891.

Witnesses.
Laurity M. Möller.
Mary C. Möller.

Inventor.
Will R. Johns.
by W. A. Copeland.
his atty

UNITED STATES PATENT OFFICE.

WILL R. JOHNS, OF BOSTON, MASSACHUSETTS, ASSIGNOR OF TWO-THIRDS TO PETER F. KEEGAN AND CHARLES H. LITTLE, BOTH OF SAME PLACE.

SELF-REGISTERING SCALE.

SPECIFICATION forming part of Letters Patent No. 454,966, dated June 30, 1891.

Application filed September 8, 1890. Serial No. 364,266. (No model.)

*To all whom it may concern:*

Be it known that I, WILL R. JOHNS, a subject of the Queen of Great Britain, residing in Boston, in the county of Suffolk and State of Massachusetts, have invented a new and useful Improvement in Self-Registering Scales, of which the following is a specification, reference being had to the accompanying drawings, which form a part hereof.

The object of my invention is a device combined with a spring-balance by which the amount of each weighing shall be recorded and also the sum of the weights; and my invention consists in combining with a spring-balance a wheel which automatically revolves and records the amount of each weighing, and a registering-wheel or train of wheels which register the sum of the weighings.

In the drawings, Fig. 9 is a vertical section on line 8 8, facing the rear. The above figures are all taken when there is no weight on the scale and all the registering parts set at zero. The balance shown is, for illustration, represented as capable of weighing ten pounds at a time. Suppose now there be applied a weight of six pounds.

The balance to which my device is represented as applied is a well-known form of spring-balance. I do not intend, however, to limit myself to the combination of my device with the special form of balance shown.

In the drawings, A represents the inclosing case for the balance, having a dial A' and an index-hand A².

A³ is the hook from which the weight is suspended, and A⁴ a ring by which the balance is suspended.

The hanger B, to which the hook A³ is attached, has a cross-bar B', with a spring B² on each arm, one end of the springs being secured to the cross-bar and the other end secured to the frame above. These springs are adjusted in tension in the usual way for spring-balances.

The shaft C carries upon its outer end the index-hand A², which revolves with the shaft. The pinion-sleeve D fits loosely on the shaft C, so as to turn without turning the shaft, and has a pinion D', with which the rack D² engages. This rack is attached to the cross-bar B' and moves up and down with the hanger B, so that when a weight is suspended from the hook A³, pulling down the cross-bar, the rack D² will move down and revolve the pinion D' and sleeve D. The sleeve D passes through the rear of the casing A and has mounted upon it the printing-wheel E, which has upon its periphery type-figures or other devices for recording numbers, properly graduated to correspond with the graduations on the dial, and representing the full capacity of the scale at one weighing.

The marking device on the printing-wheel may be type which prints with ink or cutters which cut the figures in the tape, or other well-known devices. The figures are not delineated in the drawings, as such in themselves are not new with me and will be readily understood. The tape F, wound on spool F', passes under the guide-post G, thence over the presser-roll G' and out under the friction-roll G². The numbers on the periphery of the printing-wheel E are so arranged that before any load is placed on the scale the zero-mark will be directly opposite the presser-roll G', and when a load is applied pulling down the hanger B and cross-bar B' and revolving sleeve D, as already explained, the printing-wheel E will revolve through an arc varying with the weight, and when it stops the number on the periphery opposite the presser-roll will indicate the weight of the load. The guide-post G and the rolls G' G² are mounted on a hinged bracket-arm H, which is pivoted on a leg H' and has a projecting lug $h$, which strikes against the leg H² to prevent it from falling away. Thus far the printing-wheel does not bear against the tape. A presser-bar $g$ is attached to a shaft $g'$, which turns in bearings in the frame, and is operated by lever $g^2$. When the printing-wheel has stopped after completing its partial revolution, the lever $g^2$ is pressed downward by hand, partially revolving its shaft $g'$ and carrying forward the presser-bar $g$, which strikes the pin $g^4$ on the bracket-arm H, moving arm H upward until presser-roll G' presses the tape against the printing-wheel, which thus prints on the tape the number indicating the weight of the load. As soon as the lever $g^2$ is released it is carried back to its normal position by spring $g^5$, the bracket-arm H being thrown back by spring $g^6$.

A feed-roll $h'$, preferably of rubber, is pivoted on the bracket-arm H, the tape passing between the feed-roll and friction-roll G², the feed-roll bearing with sufficient friction to feed the tape as the roll revolves. A ratchet-wheel $h^2$ is pinned on the side of the feed-roll, and a lever-arm $h^3$ is pivoted to the center of the ratchet. The outer end of lever-arm $h^3$ is connected by link $h^4$ with a lever-arm $h^5$, projecting from the shaft $g'$. A pawl $h^6$ is pivoted on the lever-arm $h^3$ and engages with the ratchet-wheel $h^2$, the pawl being held in engagement by spring $g^3$, the whole being so adjusted that when the lever $g^2$ is raised and the tape is released from contact with the printing-wheel the pawl $h^6$ turns the ratchet-wheel $h^2$ one notch, thereby turning the feed-roll $h'$, which feeds the tape along and exposes the portion containing the number just printed. This may be cut off and given to the customer, or the strip may be wound upon another spool, or otherwise disposed of.

H³ H⁴ are legs forming part of the frame.

Figure 1:
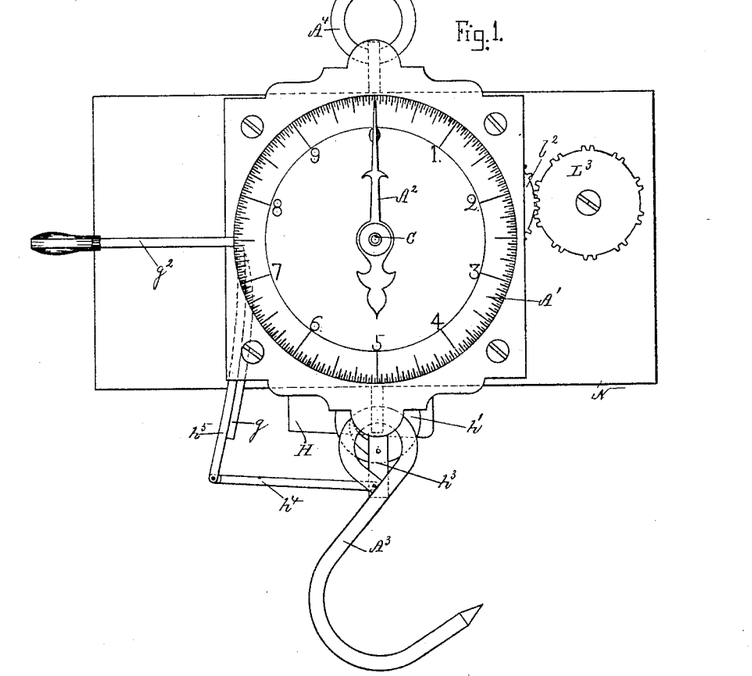
Figure 1 is a front elevation of a spring-balance embodying my invention.
Figure 2:
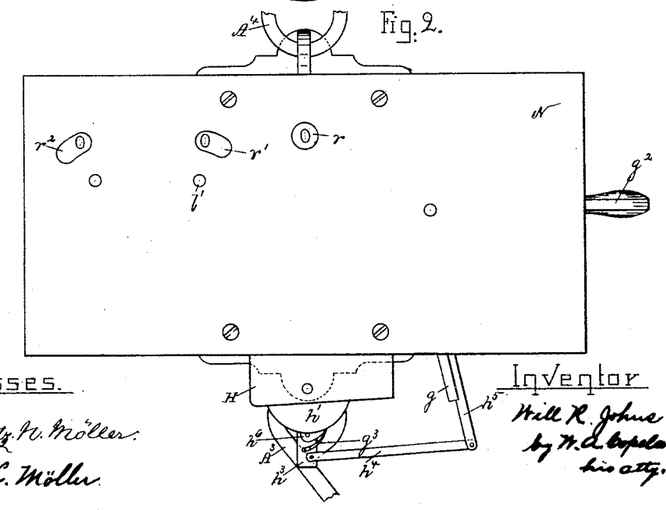
Fig. 2 is a rear elevation of the same.
Figure 3:
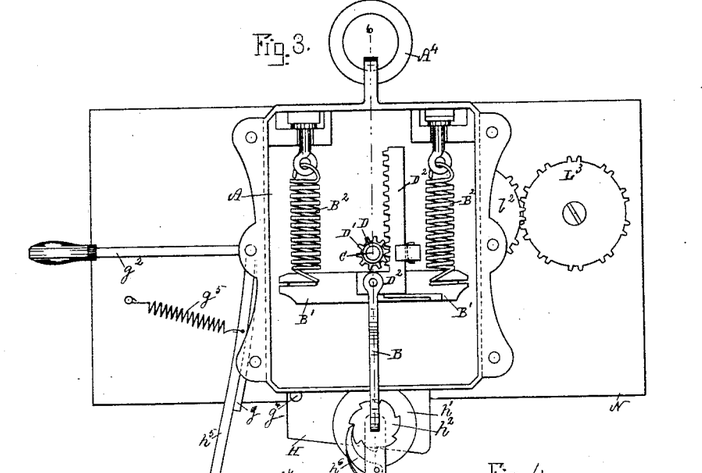
Fig. 3 is a front elevation with the dial removed.
Figure 4:
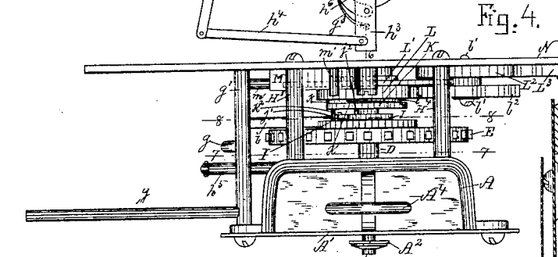
Fig. 4 is a top plan view.
Figure 5:
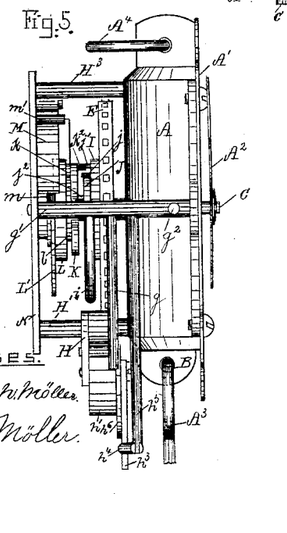
Fig. 5 is a left-hand side view.
Figure 6:
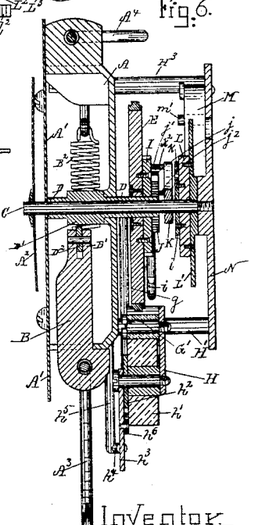
Fig. 6 is a vertical section on line 6 6 of Fig. 3.
Figure 7:
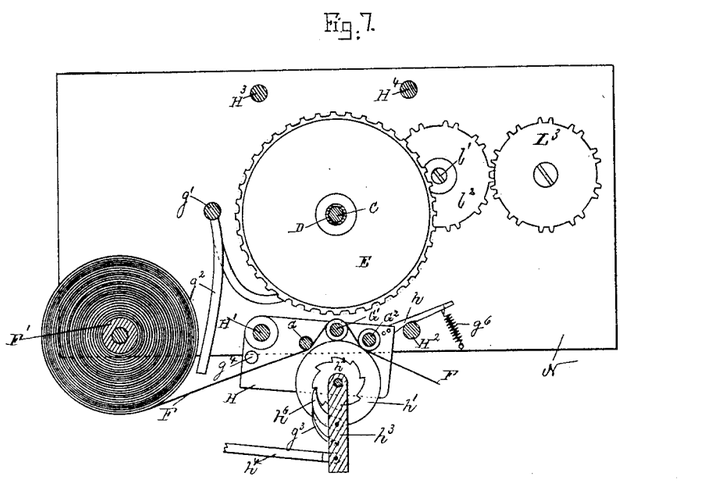
Fig. 7 is a vertical section on line 7 7 of Fig. 4, facing the printing-wheel.
Figure 8:
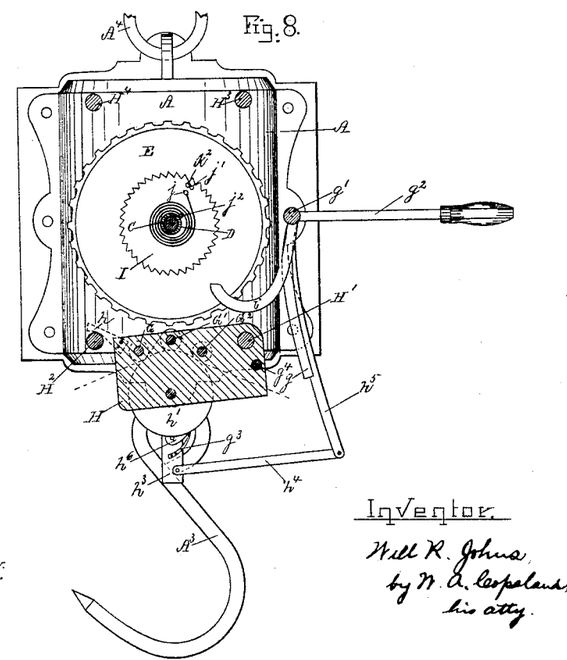
Fig. 8 is a vertical section on line 8 8 of Fig. 4, facing the printing-wheel.
Figure 9:
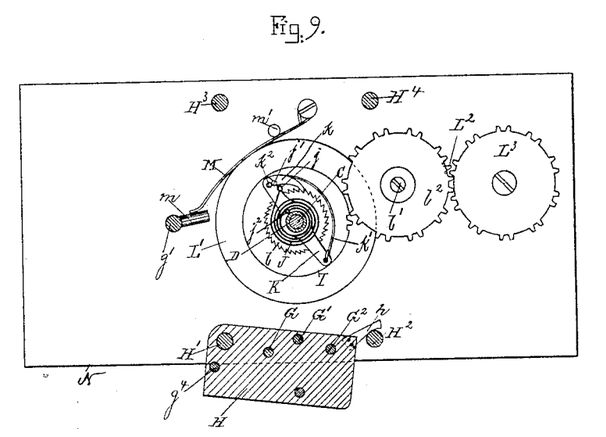
Figure 10:
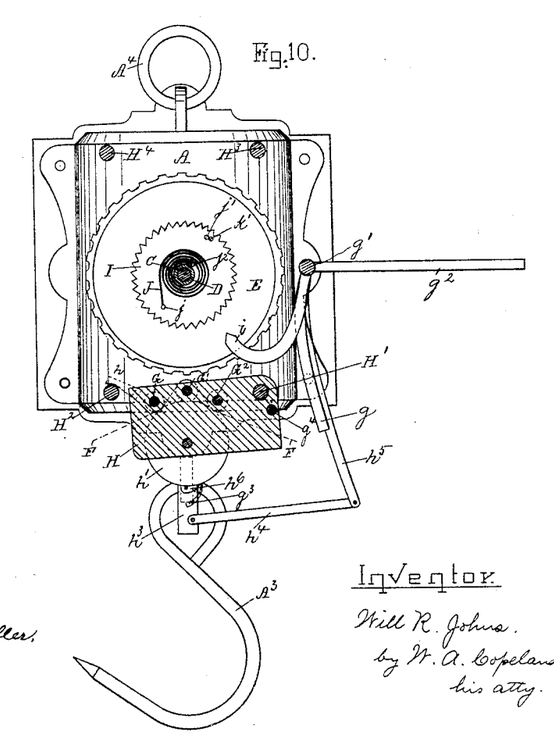
Fig. 10 is a similar view to Fig. 8, with the six-pound weight on and before the brake is removed from the registering-wheel.
Figure 11:
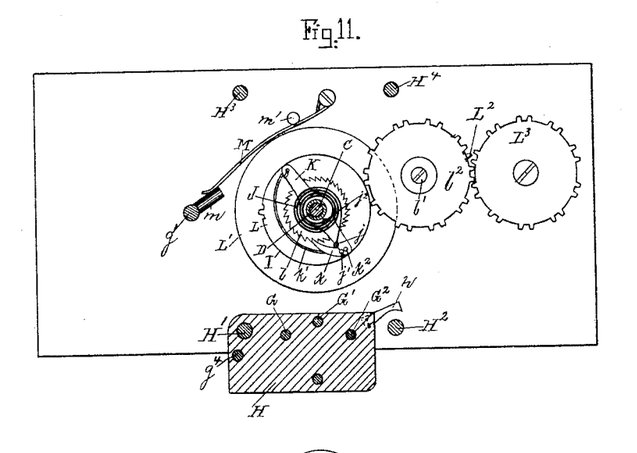
Fig. 11 is a similar view to Fig. 9, but taken after the brake-lever is pressed down, releasing the brake, and the registering-wheel has revolved.
Figure 12:
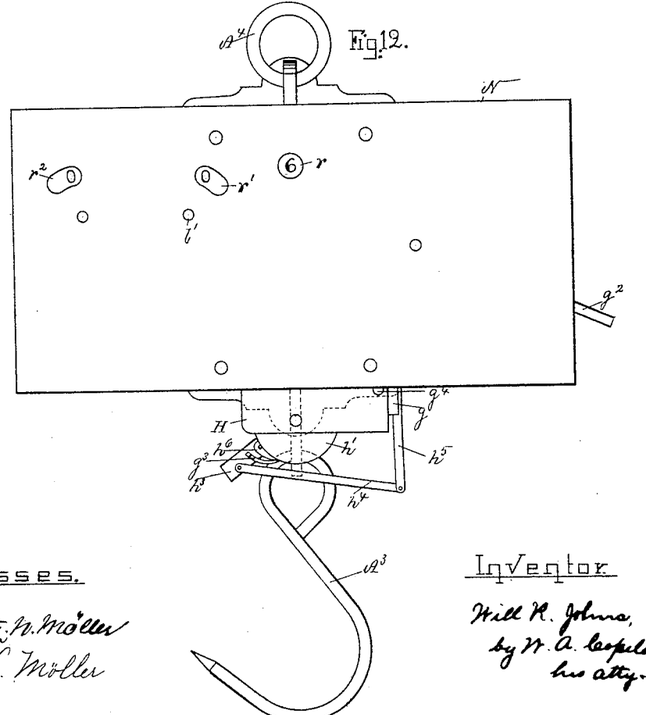
Fig. 12 is a rear view showing the reading of six pounds on the registering-wheel.
Figure 13:
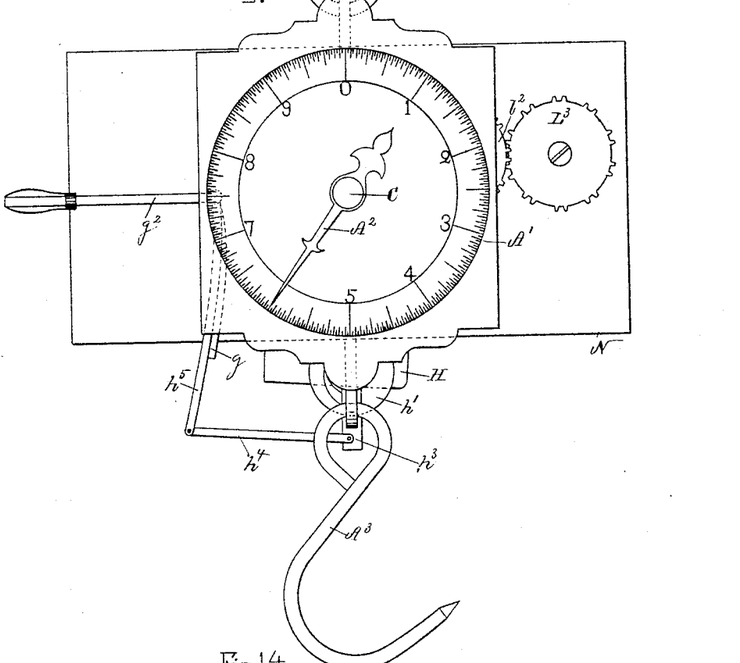
Fig. 13 is a front view showing the position of the index-hand on the dial at this time.

The printing-wheel has secured to its back face a toothed wheel I, having teeth in its periphery equal to and corresponding with the number of subdivisions on the printing-wheel. A coiled or watch spring J, around the sleeve D, has its outer end secured to a stud $j$, projecting from the face of the wheel I, and its inner end secured to a stud $j^2$, projecting from the cross-arm K, pinned on the shaft C. At one end of the cross-arm K is pivoted a pawl $k$, which engages with ratchet-wheel $l$, carried on the face of the wheel L. It is kept in engagement by spring $k'$. The wheel L is journaled on the shaft C, and carries a unit-registering disk L', fixed to its face. The wheels L L' may be integral with each other, or two wheels secured together. When the printing-wheel revolves under the strain of the weight, it winds up still tighter the spring J, which has already been wound up to adjustment with springs B², the arm K and wheel L and shaft C being kept from turning under the increased tension of the spring J by the spring-brake M, which bears on the periphery of the wheel L'. The index-hand A² is also kept from moving by reason of its fixture to the shaft C. An arm $m$, projecting from shaft $g'$, bears up against the under side of the spring-brake M. As soon as the printing-wheel has come to rest, with the number on its periphery opposite the presser-roll, the lever $g^2$ is pressed down by hand, thus carrying up arm $m$, which raises the brake from the wheel L'. The stop $m'$ limits the movement of the brake. The wheels L and L' and shaft C are now free to move under action of spring J and are rotated a distance proportioned to the increased tension produced by the weight, and cross-arm K and hand A² also turn with them. The hand will indicate on the dial the arc through which it has turned, and thereby indicate the weight. The pawl $k$, engaging with ratchet-wheel $l$ on wheel L also causes wheel L' to turn through the same arc, and the number on its face exposed through the opening $r$ in the back N indicates the weight, as in Fig. 12.

The stud $k^2$, which forms the pivot for pawl $k$, serves as a stop, which strikes against the stud $j'$ on the face of wheel I, so that the arm K and shaft C shall not be thrown around farther than they ought.

Figure 14:
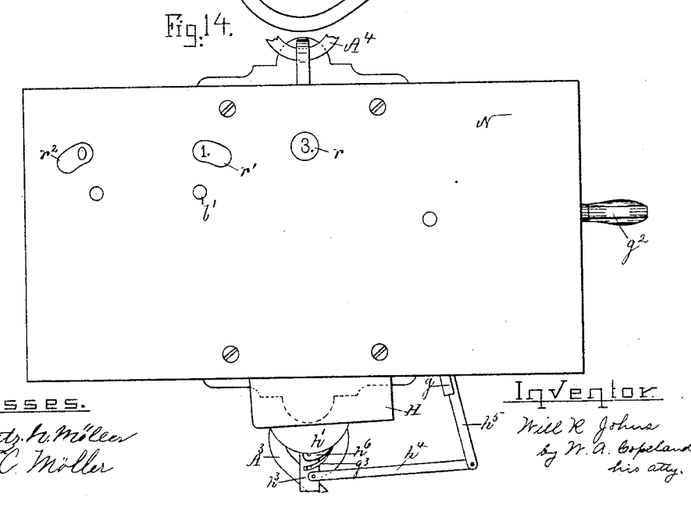
Fig. 14 is a rear view showing the reading on the registering-wheel when an additional weight of seven pounds has been added.
Figure 15:
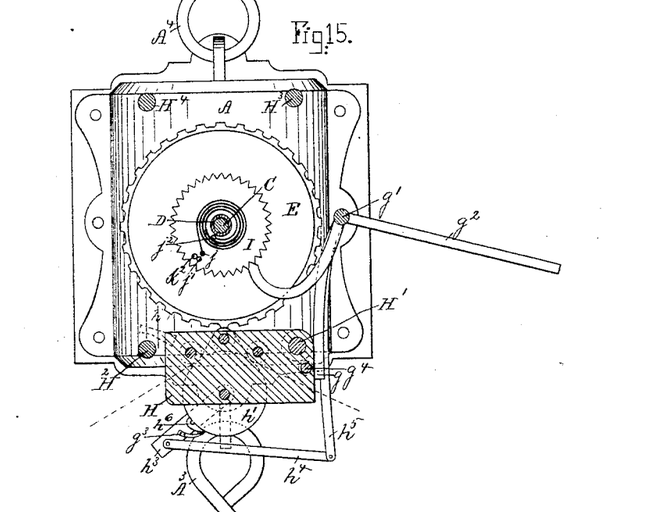
Fig. 15 is a similar view to Fig. 10 after the brake has been released, facing the printing-wheel.
Figure 16:
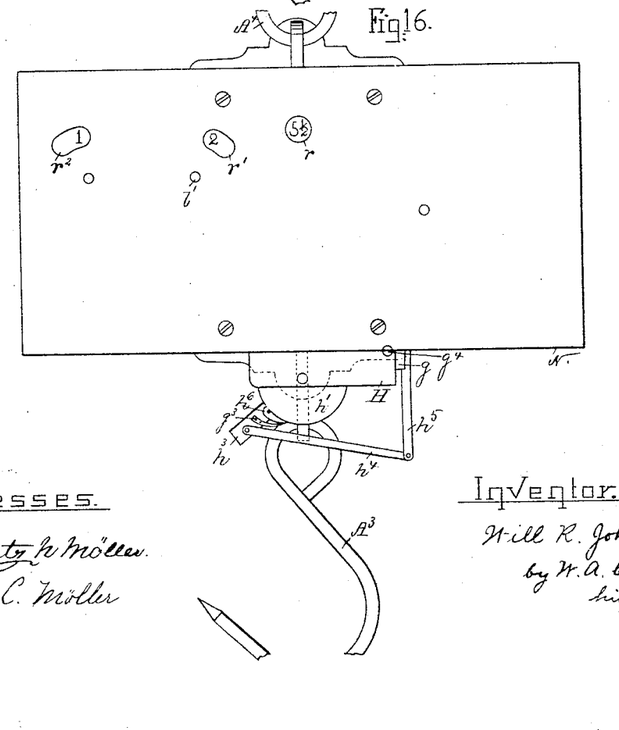
Fig. 16 is a rear view showing the reading after a series of weighings of which the sum is 125½ pounds.

By the same downward pressure of lever $g^2$ which causes the arm $m$ to lift the brake M the presser-bar $g$ strikes the pin $g^4$ on the bracket-arm H, moving the bracket H upward and causing presser-roll G' to press the tape against the printing-wheel in the manner already described. At the same time arm $i$, projecting from shaft $g'$, engages with toothed wheel I to prevent the printing-wheel from revolving farther before the impression is made on the tape. The lever $g^2$ being now released, spring $g^5$ throws its back to first position again. The load is then removed. The retraction of springs B² will carry up again rack D² and sleeve D will revolve backward, returning the printing-wheel E to its first position, with zero again opposite the presser-roll. The retrograde movement of the sleeve D and printing-wheel E, together with toothed wheel I, having the stud $j'$ bearing against stud $k^2$ on the cross-arm K, gives also a retrograde movement to the cross-arm K and shaft C, turning hand A² back to zero. Brake M, now bearing on the wheel L', prevents it from moving back, as shaft C is journaled loosely within it, but pawl $k$ slips back over the teeth of wheel C. If now a second weight of, say, seven pounds be placed on the hook, the printing-wheel will record the figure 7 on the tape and the index-hand will point to 7. The registering-wheel L', starting, however, from figure 6, where it was left after the last weighing, will revolve until it reaches 10, when the single tooth in periphery of wheel L will engage with one of the ten teeth on wheel $l^2$, moving it around one notch and turning wheel $L^2$ on the same shaft $l'$ until it exposes the figure 1 in the opening $r'$ on the rear face, as shown in Fig. 14. Wheel L' will move past the zero-point to figure 3, so that one ten and three units will thus be recorded. The same process is repeated through successive weighings until ten tens are recorded, when they will be transferred in same way to the hundreds-wheel $L^3$, as shown in Fig. 16 at the opening $r^2$. The capacity of the first registering-wheel L' is not necessarily limited to ten pounds. It may be any number adapted to the size of the wheel, and the number exposed at the reading-opening of the second wheel will show the number of revolutions of the first wheel.

Instead of the brake M, any form of suitable detent may be used which will hold the wheel L' from revolving until the printing-wheel has completed its forward movement.

The opposite ends of the coiled spring J need not be secured in exactly the manner shown in the drawings, the main purpose being to secure one end, so as to move with the sleeve and printing-wheel and the other end to move with the shaft, so that if the sleeve rotates forward and the shaft is stationary the spring will wind up.

The whole balance should be inclosed in a suitable case with slots for the hook and for the operating-lever $g^2$, and locked to prevent interference by the operator with the registering mechanism.

What I claim as my invention is—

1. The combination of a spring-balance with a printing-wheel revolved automatically when a load is placed on the balance, a device by which a tape is pressed against the printing-wheel to receive the record of the number indicating the weight, and a wheel or train of wheels which automatically add and register the sum of the weights of successive loads, substantially as described.

2. The combination of a spring-balance with a printing-wheel revolved automatically when a load is placed on the balance, so adjusted as to bring a number on the printing-wheel indicating the weight of the load opposite a presser-roll, a tape which passes between the presser-roll and the printing-wheel and a device for pressing the tape against the printing-wheel to receive the record of the number indicating the weight, a spring which is wound up by the revolution of the printing-wheel, a registering-wheel connected with the spring and adapted to be revolved by the tension of the spring, a device to keep the registering-wheel from revolving until the printing-wheel has completed its forward movement, and when the detent is removed the spring will operate to revolve the registering-wheel, substantially as described.

3. The combination of a spring-balance with a printing-wheel mounted on an axis which is connected with the mechanism of the balance so as to revolve automatically when a load is placed on the scale, the printing-wheel having figures thereon so adjusted as to bring a number on the printing-wheel indicating the weight of the load opposite a presser-roll mounted on a hinged bracket, a tape which passes between the presser-roll and the printing-wheel, a presser-bar by which the bracket is moved on its hinge to cause the presser-roll to press the tape against the printing-wheel to receive the record of the number indicating the weight, a feed to move the tape along after the printing and the presser-roll is released, a spring which is wound up by the revolution of the printing-wheel, a registering-wheel connected with the spring and adapted to be revolved by the tension of the spring when wound up by the weight, a device to keep the registering-wheel from revolving until the printing-wheel has completed its forward movement, and when the detent is removed the spring will revolve the registering-wheel to indicate at the reading-opening the sum of the weighings, substantially as described.

4. The combination of a spring-balance with a printing-wheel mounted on an axis which is connected with the mechanism of the balance so as to revolve automatically when a load is placed on the scale, the printing-wheel having type-figures thereon so adjusted as to bring a number on the printing-wheel indicating the weight of the load opposite a presser-roll mounted on a hinged bracket, a tape which passes between the presser-roll and the printing-wheel, a presser-bar attached to a shaft and operated by a lever which causes the presser-bar to move the bracket on its hinge and cause the presser-roll to press the tape against the printing-wheel to receive the record of the number indicating the weight of the load, a feed-roll mounted on the said bracket having a ratchet-wheel on its face, an arm pivoted to said ratchet-wheel carrying a spring-pawl which engages with said ratchet and connected by a link with a rod projecting from the shaft to which the presser-bar is attached, so that when the lever is raised to rotate the shaft back and release the presser-bar it will turn the arm pivoted to the ratchet-wheel, and the pawl engaging with the ratchet will cause the feed-roll to revolve a limited distance and feed the tape to expose the last number printed thereon, a coiled spring around the axis of the printing-wheel which is wound up by the revolution of the printing-wheel, a registering-wheel connected with the spring and adapted to be revolved by the tension of the spring when wound up by the weight, a device to keep the registering-wheel from revolving until the printing-wheel has completed its forward movement, and when the detent is removed the spring will revolve the registering-wheel to indicate at the reading-opening the sum of the weighings, substantially as described.

5. The combination of a spring-balance with a printing-wheel mounted on an axis which is connected with the mechanism of the balance so as to revolve automatically when a load is placed on the scale, the printing-wheel having figures thereon so adjusted as to bring a number on the printing-wheel indicating the weight of the load opposite a presser-roll, a tape which passes between the presser-roll and the printing-wheel to receive the record of the number indicating the weight, a detent to keep the printing-wheel from further motion while the printing is being done, a spring which is wound up by the revolution of the printing-wheel, a registering-wheel connected with the spring and adapted to be revolved by the tension of the spring, a device to keep the registering-wheel from revolving until the printing-wheel has completed its forward movement, and when the detent is released from the registering-wheel the spring will operate to revolve the registering-wheel to indicate at the reading-opening the sum of the weighings, substantially as described.

6. The combination of a spring-balance with a shaft C, having a pinion-sleeve D, which is free to turn on the shaft, a rack which engages with the pinion and is operated by the balance-spring when a load is placed on the scale, so that the distension of the spring by the weight will cause the rack to rotate the pinion-sleeve a distance proportionate to the weight, a wheel E, mounted on the pinion-sleeve and rotating with it, having numbers thereon so adjusted as to bring to a certain position when the wheel stops a number indicating the weight of the load, a cross-arm K, fixed on the shaft C, a coiled spring having one end fixed to turn with the sleeve and the other end fixed to the cross-arm K to turn with the shaft, a graduated registering-wheel L', journaled upon the shaft C and having a ratchet-wheel upon its inner face, with which a spring-pawl attached to the cross-arm K engages, a holding device to keep the shaft and registering-wheel from revolving when the sleeve and its recording-wheel rotate, so that the rotation of the sleeve by the weight will wind the coiled spring proportionately, means for releasing the detent on the registering-wheel after the completion of the forward movement by the wheel E, and allowing the spring to rotate the shaft and registering-wheel a distance proportionate to the weight, substantially as described.

7. The combination of a spring-balance with a shaft C, having a pinion-sleeve D, which is free to turn on the shaft, a rack which engages with the pinion and is operated by the balance-spring when a load is placed on the scale, so that the distension of the spring by the weight will cause the rack to rotate the pinion-sleeve a distance proportionate to the weight, a printing-wheel mounted on the pinion-sleeve and rotating with it, having numbers thereon so adjusted as to bring a number indicating the weight of the load against a tape, which receives the record of the number, a cross-arm K, fixed on the shaft C, a coiled spring around the shaft having one end fixed to turn with the sleeve and the other end fixed to the arm K to turn with the shaft, a graduated total-registering wheel journaled upon the shaft C and having a ratchet-wheel upon its face, with which a spring-pawl attached to the cross-arm K engages, a holding device to keep the shaft and registering-wheel from rotating when the sleeve and printing-wheel rotate, thereby winding up the spring, means for releasing the detent on the registering-wheel after the printing-wheel has completed its forward movement, and allowing the spring to rotate the shaft and registering-wheel a distance proportionate to the weight, substantially as described.

8. The combination of a spring-balance with a shaft C, having a pinion-sleeve D, which is free to turn on the shaft, a rack which engages with the pinion and is operated by the balance-spring when a load is placed on the scale, so that the distension of the spring by the weight will cause the rack to rotate the pinion-sleeve a distance proportionate to the weight, a printing-wheel mounted on the pinion-sleeve and rotating with it, having numbers thereon so adjusted as to bring a number indicating the weight of the load into a certain position when the printing-wheel stops, and means for recording the same on a tape, a cross-arm K, fixed to the shaft C, a coiled spring having one end fixed to turn with the sleeve and the other end fixed to the cross-arm K to turn with the shaft, a graduated total-registering wheel journaled upon the shaft and having a ratchet-wheel upon its face with which a spring-pawl attached to the cross-arm K engages, a holding device to keep the shaft and total-registering wheel from rotating when the sleeve and printing-wheel rotate, thereby winding up the coiled spring, means for releasing the detent on the total-registering wheel after the printing-wheel has completed its forward movement and allowing the spring to rotate the shaft and total-registering wheel a distance proportionate to the weight, and a stop to limit the rotation of the registering-wheel beyond the proper point, substantially as described.

9. The combination of a spring-balance with a shaft C, having a pinion-sleeve D, which is free to turn on the shaft, a rack which engages with the pinion and is operated by the balance-spring when a load is placed on the scale, so that the distension of the spring by the weight will cause the rack to rotate the pinion-sleeve a distance proportionate to the weight, a printing-wheel mounted on the pinion-sleeve and rotating with it, having numbers thereon so adjusted as to bring a number indicating the weight of the load into a certain position when the printing-wheel has moved its full distance, and means for recording the same on a tape, a cross-arm K, fixed to the shaft C, a coiled spring having one end fixed to turn with the sleeve and the other end fixed to the cross-arm K to turn with the shaft, a graduated total-registering wheel journaled upon the shaft and having a ratchet-wheel upon its face with which a pawl attached to the cross-arm engages, a holding device to keep the shaft and total-registering wheel from rotating when the sleeve and printing-wheel rotate, thereby winding up the coiled spring, means for releasing the detent on the total-registering wheel after the printing-wheel has completed its forward movement and allowing the spring to rotate the shaft and total-registering wheel a distance proportionate to the weight, and a stop to check the movement of the cross-arm, and thereby the rotation of the registering-wheel beyond the proper point, a series of registering-wheels of successively higher order than the first, geared thereto in such a way that when the first wheel has completed one revolution the second wheel will be moved one notch and when the second wheel has completed a revolution the third wheel will be moved one notch, and so on, the several readings on the series of wheels as exposed at the reading-openings indicating the sum of all the weighings, substantially as described.

10. The combination of a spring-balance with a shaft C, having a pinion-sleeve D, which is free to turn on the shaft, a rack which engages with the pinion and is operated by the balance-spring when a load is placed on the scale, so that the distension of the spring by the weight will cause the rack to rotate the pinion-sleeve a distance proportionate to the weight, a printing-wheel mounted on the pinion-sleeve and rotating with it, having numbers thereon so adjusted as to bring a number indicating the weight of the load opposite a presser-roll mounted on a hinged bracket, a tape which passes between the presser-roll and the printing-wheel, a presser-bar attached to a shaft and operated by a lever, which causes the presser-bar to move the bracket on its hinge, and cause the presser-roll to press the tape against the printing-wheel to receive the record of the number indicating the weight of the load, a detent-rod operated by the same movement of the lever to engage with a toothed disk on the face of the printing-wheel to prevent further rotation of the printing-wheel until after the weight is recorded, a feed-roll mounted on said bracket having a ratchet-wheel on its face, an arm pivoted to said ratchet-wheel carrying a spring-pawl, which engages with said ratchet and connected by a link with a rod projecting from the shaft to which the presser-bar is attached, so that when the lever is raised to rotate the shaft back and release the presser-bar it will turn the arm pivoted to the ratchet-wheel, and the pawl engaging with the ratchet will cause the feed-roll to revolve a limited distance and feed the tape to expose the number recorded thereon, a cross-arm K, fixed to the shaft C, a coiled spring which has one end fixed to turn with the sleeve and the other end fixed to the cross-arm K to turn with the shaft, a graduated total-registering wheel journaled upon the shaft and having a ratchet-wheel upon its face with which a pawl attached to the cross-arm engages, a brake to keep the shaft and total-registering wheel from rotating when the sleeve and printing-wheel rotate, thereby winding up the spiral spring, an arm to lift the brake and operated by the same downward movement of the lever which operates the presser-bar, and allowing the spiral spring to rotate the shaft and total-registering wheel a distance proportionate to the weight, and a stop to check the movement of the cross-arm and the rotation of the registering-wheel beyond the proper point, a series of registering-wheels of successively higher order than the first, geared thereto in such a way that when the first wheel has completed one revolution the second wheel will be moved one notch, and when the second wheel has completed a revolution the third wheel will be moved one notch, and so on, the several readings on the series of wheels as exposed at the reading-openings indicating the sum of all the weighings, substantially as described.

WILL R. JOHNS.

Witnesses:
WM. H. WHITE,
WM. A. COPELAND.